US008972072B2

(12) United States Patent  
Kritt et al.

(10) Patent No.: US 8,972,072 B2  
(45) Date of Patent: Mar. 3, 2015

(54) OPTIMIZING POWER CONSUMPTION IN PLANNED PROJECTS

(75) Inventors: Barry Alan Kritt, Releigh, NC (US); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 13/325,956

(22) Filed: Dec. 14, 2011

(65) Prior Publication Data

US 2013/0158732 A1   Jun. 20, 2013

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *G06Q 10/00* | (2012.01) | |
| *G01R 11/56* | (2006.01) | |
| *G01R 21/133* | (2006.01) | |
| *G06F 17/00* | (2006.01) | |
| *G06F 3/00* | (2006.01) | |
| *G06F 9/455* | (2006.01) | |
| *G06F 17/50* | (2006.01) | |

(52) U.S. Cl.
USPC ......... 700/291; 705/7.23; 705/7.37; 705/412; 715/700; 716/109; 716/120; 716/133

(58) Field of Classification Search
CPC ... G06Q 50/06; G06Q 10/04; G06Q 10/0631; G06Q 10/06375; G06Q 10/06; G06Q 10/06313; H02J 13/0017; H02J 2003/003; H02J 2003/007; Y02B 70/3216; Y02B 90/241; Y02B 90/245; Y02B 90/248; Y04S 20/221; Y04S 20/32; Y04S 20/40; Y04S 20/52; F24F 11/0009; F24F 2011/0075; G01D 4/0002; G05B 23/0294; G06F 2217/78
USPC .............. 700/275, 276, 286, 291, 295; 703/2; 705/1.1, 7.11, 7.36, 7.37, 400, 412, 705/7.12, 7.23; 716/132, 133, 100, 101, 716/106, 109, 110, 118–120; 340/870.01, 340/870.02, 870.16; 715/700
See application file for complete search history.

(56) References Cited

U.S. PATENT DOCUMENTS

| | | | | |
|---|---|---|---|---|
| 6,668,337 | B2 * | 12/2003 | Takahashi et al. | ............. 714/6.1 |
| 7,103,452 | B2 * | 9/2006 | Retsina | ........................ 700/291 |
| 7,552,033 | B1 * | 6/2009 | Culp et al. | ........................ 703/2 |
| 8,024,082 | B2 * | 9/2011 | Richter et al. | .................... 701/22 |
| 8,155,795 | B2 * | 4/2012 | Ohuchi et al. | ................ 700/291 |
| 8,645,183 | B2 * | 2/2014 | Shin et al. | .................... 705/7.23 |
| 2009/0018705 | A1 * | 1/2009 | Ouchi et al. | .................. 700/291 |
| 2009/0171646 | A1 | 7/2009 | Silbermintz et al. | |
| 2010/0010857 | A1 | 1/2010 | Fadell | |
| 2010/0017242 | A1 * | 1/2010 | Hamilton et al. | ................. 705/8 |
| 2010/0268974 | A1 | 10/2010 | Floyd et al. | |

(Continued)

*Primary Examiner* — Crystal J Barnes-Bullock  
(74) *Attorney, Agent, or Firm* — J. B. Kraft; Danion Josephs (57) ABSTRACT

Automatically accesses, from a database, the rate of power consumption of each object on a displayed list and automatically calculating the power consumption of each object over a planned period time of use of the object. Then, during actual use, the actual power consumption of each object on the list is automatically tracked over the planned period of time of use and the difference between the planned and actual power consumption of each object on the list is automatically calculated. The difference for each object on the list is displayed so that the user may take action interactively.

14 Claims, 7 Drawing Sheets

(56) References Cited

U.S. PATENT DOCUMENTS

| | | | |
|---|---|---|---|
| 2011/0004350 A1* | 1/2011 | Cheifetz et al. | 700/276 |
| 2011/0029341 A1* | 2/2011 | Muse et al. | 705/7 |
| 2011/0060927 A1 | 3/2011 | Fillingim et al. | |
| 2011/0106326 A1 | 5/2011 | Anunobi et al. | |
| 2011/0187557 A1* | 8/2011 | Dietzler | 340/870.16 |
| 2011/0196546 A1* | 8/2011 | Muller et al. | 700/295 |
| 2012/0215369 A1* | 8/2012 | Desai et al. | 700/291 |
| 2012/0317408 A1* | 12/2012 | Happonen et al. | 713/100 |
| 2013/0158733 A1* | 6/2013 | Kritt et al. | 700/291 |
| 2014/0005838 A1* | 1/2014 | Ogura | 700/276 |

\* cited by examiner

FIG. 2

| Task Name | Work | Duration | Start | Finish | Resource Names | Actual Power Consumption | Planned Power Consumption |
|---|---|---|---|---|---|---|---|
| ALAMEDA | 5 Days | 16 Days | Fri 9/3/11 | Tues 9/20/11 | Non-Residential | 40039.40773 | 7639.717558 |
| ALAMEDA | 14 Days | 12 Days | Tues 9/20/11 | Wed 9/21/11 | Residential | 15173.05677 | 3038.532269 |
| ALAMEDA | 19 Days | 3 Days | Wed 9/21/11 | Mon 10/10/11 | Total | 56112.4965 | 10878.24993 |
| ALPINE | 7 Days | 1 Day | Mon 10/10/11 | Fri 9/3/11 | Non-Residential | 260.543425 | 115.676257 |
| ALPINE | 4 Days | 14 Days | Fri 9/3/11 | Tues 9/20/11 | Residential | 235.090378 | 96.92292 |
| ALPINE | 16 Days | 19 Days | Tues 9/20/11 | Wed 9/21/11 | Total | 495.633806 | 212.549178 |
| AMADOR | 12 Days | 7 Days | Wed 9/21/11 | Mon 10/10/11 | Non-Residential | 895.375295 | 177.430898 |
| AMADOR | 3 Days | 4 Days | Mon 10/10/11 | Fri 9/3/11 | Residential | 713.68823 | 140.653246 |
| AMADOR | 1 Day | 5 Days | Fri 9/3/11 | Tues 9/20/11 | Total | 1609.063526 | 318.084144 |
| BUTTE | 14 Days | 1 Day | Tues 9/20/11 | Wed 9/21/11 | Non-Residential | 3625.10152 | 697.189806 |
| BUTTE | 19 Days | 14 Days | Wed 9/21/11 | Mon 10/10/11 | Residential | 3608.425326 | 722.738706 |
| BUTTE | 7 Days | 19 Days | Mon 10/10/11 | Fri 9/3/11 | Total | 7233.526848 | 1419.928514 |
| CALAVERAS | 4 Days | 7 Days | Fri 9/3/11 | Tues 9/20/11 | Non-Residential | 621.789669 | 126.062057 |
| CALAVERAS | 5 Days | 16 Days | Tues 9/20/11 | Wed 9/21/11 | Residential | 998.093049 | 198.957241 |
| CALAVERAS | 14 Days | 12 Days | Wed 9/21/11 | Mon 10/10/11 | Total | 1619.882711 | 325.019299 |
| COLUSA | 19 Days | 3 Days | Mon 10/10/11 | Tues 12/19/11 | Non-Residential | 949.164074 | 194.443987 |
| COLUSA | 7 Days | 1 Day | Tues 12/12/11 | Thurs 12/19/11 | Residential | 323.622178 | 63.773675 |
| COLUSA | 4 Days | 14 Days | Thurs 12/14/11 | Mon 1/25/12 | Total | 1272.786255 | 258.217263 |
| CONTRA COSTA | 1 Day | 19 Days | Mon 1/15/12 | Mon 10/10/11 | Non-Residential | 30674.49853 | 6468.205233 |
| CONTRA COSTA | 14 Days | 7 Days | Fri 9/3/11 | Mon 10/17/11 | Residential | 13835.19044 | 2746.9657 |
| CONTRA COSTA | 1 Day | 4 Days | Tues 9/20/11 | Tues 12/19/11 | Total | 44509.65697 | 9215.170934 |
| DEL NORTE | 14 Days | 5 Days | Wed 9/21/11 | Thurs 12/15/11 | Non-Residential | 505.712709 | 93.271675 |
| DEL NORTE | 19 Days | 14 Days | Fri 9/3/11 | Mon 10/10/11 | Residential | 671.046553 | 137.861469 |
| DEL NORTE | 7 Days | 19 Days | Tues 9/20/11 | Mon 1/25/12 | Total | 1176.759264 | 231.153145 |
| EL DORADO | 4 Days | 7 Days | Wed 9/21/11 | Mon 10/17/11 | Non-Residential | 2521.989907 | 432.781929 |
| EL DORADO | 5 Days | 4 Days | Mon 10/10/11 | Tues 12/19/11 | Residential | 3836.502678 | 769.593806 |
| EL DORADO | 1 Day | 5 Days | Fri 9/3/11 | Thurs 12/19/11 | Total | 6358.492559 | 1252.475738 |
| FRESNO | 14 Days | 1 Day | Fri 9/3/11 | Mon 1/25/12 | Non-Residential | 22111.27851 | 4418.672032 |
| FRESNO | 19 Days | 14 Days | Tues 9/20/11 | Mon 10/10/11 | Residential | 12767.20643 | 2563.105499 |
| FRESNO | 1 Day | 19 Days | Wed 9/21/11 | Mon 10/10/11 | Total | 34878.48494 | 6977.777537 |

45 — Task Name column
46 — Resource Names column
47 — Start column
48 — Finish column
49 — Planned Power Consumption column
50 — Actual Power Consumption column

FIG. 3

| Task Name | Work | Duration | Start | Finish | Resource Names | Actual Power Consumption | Planned Power Consumption |
|---|---|---|---|---|---|---|---|
| ALAMEDA | 5 Days | 16 Days | Fri 9/3/11 | Tues 9/20/11 | Non-Residential | 40939.40773 | 7639.717558 |
| ALAMEDA | 14 Days | 12 Days | Tues 9/20/11 | Wed 9/21/11 | Residential | 15173.08877 | 3038.532269 |
| ALAMEDA | 19 Days | 3 Days | Wed 9/21/11 | Mon 10/10/11 | Total | 56112.4965 | 10878.24983 |
| ALPINE | 7 Days | 1 Day | Mon 10/10/11 | Fri 9/3/11 | Non-Residential | 260.543425 | 115.626257 |
| ALPINE | 4 Days | 14 Days | Fri 9/3/11 | Tues 9/20/11 | Residential | 235.090378 | 96.92292 |
| AMADOR | 16 Days | 19 Days | Tues 9/20/11 | Wed 9/21/11 | Total | 495.63806 | 212.549178 |
| AMADOR | 12 Days | 7 Days | Wed 9/21/11 | Mon 10/10/11 | Non-Residential | 895.375295 | 177.430 |
| AMADOR | 3 Days | 4 Da | | | | 713.56823 | 140.663246 |
| BUTTE | 1 Day | 5 Da | | | | 1609.06 | 318.084144 |
| BUTTE | 14 Days | 14 D | | | | 1525.10152 | 697.189806 |
| BUTTE | 19 Days | 19 D | | | | 3608.425326 | 722.730708 |
| CALAVERAS | 7 Days | 7 Da | | | | 7233.526848 | 1419.928514 |
| CALAVERAS | 4 Days | 4 Da | | | | 621.789659 | 126.062057 |
| CALAVERAS | 5 Days | 16 D | | | | 990.093049 | 198.957241 |
| COLUSA | 14 Days | 12 D | | | | 1619.682711 | 325.019299 |
| COLUSA | 19 Days | 3 Da | | | | 949.164074 | 194.443387 |
| COLUSA | 7 Days | 1 D | | | | 323.622178 | 63.773875 |
| CONTRA COSTA | 4 Days | 14 D | | | | 1272.786255 | 256.217263 |
| CONTRA COSTA | 1 Day | 19 D | | | | 30674.48853 | 6468.205233 |
| CONTRA COSTA | 14 Days | 7 Da | | | | 13835.16844 | 2746.9657 |
| DEL NORTE | 1 Day | 4 Da | | | | 44509.65697 | 9215.170934 |
| DEL NORTE | 14 Days | 5 Da | | | | 506.712709 | 93.271675 |
| DEL NORTE | 19 Days | 14 D | | | | 671.046553 | 137.881469 |
| EL DORADO | 7 Days | 19 | | | | 1176.759264 | 231.153145 |
| EL DORADO | 4 Days | 7 Days | Tues 9/3/11 | Mon 10/10/11 | Non-Residential | 2521.989907 | 482.781929 |
| EL DORADO | 5 Days | 4 Days | Wed 9/21/11 | Mon 10/17/11 | Residential | 3635.502578 | 769.693808 |
| FRESNO | 1 Day | 1 Day | Mon 10/10/11 | Tues 12/19/11 | Total | 6358.493589 | 1252.475738 |
| FRESNO | 14 Days | 14 Days | Fri 9/3/11 | Thurs 12/19/11 | Non-Residential | 22111.27851 | 4418.672032 |
| FRESNO | 19 Days | 19 Days | Tues 9/20/11 | Mon 1/25/12 | Residential | 12767.20843 | 2559.105499 |
| FRESNO | 1 Day | 7 Days | Wed 9/21/11 | Mon 10/10/11 | Total | 34878.48594 | 6977.777537 |

Popup dialog:
- RESOURCE: ACME 4XL SERVER
- TIME/DAY: 24 HRS
- FROM: 07/11/10
- TO: 08/14/10
- SUBMIT

FIG. 4

| Task Name | Work | Duration | Start | Finish | Resource Names | Actural Power Consumption | Planned Power Consumption |
|---|---|---|---|---|---|---|---|
| ALAMEDA | 5 Days | 16 Days | Fri 9/3/11 | Tues 9/20/11 | Non-Residential | 40939.40773 | 7833.717558 |
| ALAMEDA | 14 Days | 12 Days | Tues 9/20/11 | Wed 9/21/11 | Residential | 15173.03877 | 3098.532299 |
| ALAMEDA | 19 Days | 3 Days | Wed 9/21/11 | Mon 10/10/11 | Total | 56112.4965 | 10978.24983 |
| ALPINE | 7 Days | 1 Day | | Fri 9/3/11 | Non-Residential | 260.543425 | 115.626257 |
| ALPINE | 4 Days | 14 Day | | Tues 9/20/11 | Residential | 235.090378 | 96.92292 |
| AMADOR | 16 Days | 19 Days | | Wed 9/21/11 | Total | 495.633806 | 212.549178 |
| AMADOR | 12 Days | 7 Days | | Wed 10/10/11 | Non-Residential | 895.375295 | 177.430 |
| AMADOR | 3 Days | 4 D | | | | .063526 | 140 .246 |
| BUTTE | 1 Day | 5 Da | | | | .663526 | 318.084144 |
| BUTTE | 14 Days | 14 | | | | 5.10 | 697.185806 |
| BUTTE | 19 Days | 19 D | | | | .425326 | 722.738708 |
| CALAVERAS | 7 Days | 7 Da | | | | .526848 | 1419.928514 |
| CALAVERAS | 4 Days | 5 D | | | | .789659 | 126.062057 |
| CALAVERAS | 14 Days | 16 D | | | | .093049 | 198.957241 |
| COLUSA | 19 Days | 12 D | | | | .882711 | 325.019299 |
| COLUSA | 7 Days | 3 Da | | | | .184074 | 194.443397 |
| COLUSA | 4 Days | 1 Da | | | | .622178 | 63.773875 |
| CONTRA COSTA | 1 Day | 14 D | | | | .786255 | 258.217263 |
| CONTRA COSTA | 14 Days | 19 D | | | | 4.44853 | 6458.205233 |
| CONTRA COSTA | 1 Day | 7 Da | | | | 5.16844 | 2745.9657 |
| DEL NORTE | 14 Days | 5 Da | | | | 9.65697 | 9215.170934 |
| DEL NORTE | 19 Days | 14 D | | | | .712709 | 93.271675 |
| DEL NORTE | 7 Days | 19 D | | | | .046553 | 137.881469 |
| EL DORADO | 4 Days | 7 Days | | Tues 9/20/11 | Non-Residential | .759264 | 231.153145 |
| EL DORADO | 5 Days | 4 Days | | Wed 9/21/11 | Residential | 2521.988907 | 482.781929 |
| EL DORADO | 1 Day | 1 Day | | Mon 10/10/11 | Total | 3036.502678 | 769.633805 |
| FRESNO | 14 Days | 14 Days | Fri 9/3/11 | Thurs 12/19/11 | Non-Residential | 6358.492589 | 1252.475738 |
| FRESNO | 19 Days | 19 Days | Tues 9/20/11 | Mon 1/25/12 | Residential | 22111.27851 | 4418.672032 |
| FRESNO | 1 Day | 7 Days | Wed 9/21/11 | Mon 10/10/11 | Total | 12767.20843 | 2559.105499 |

Popup dialog fields:
- RESOURCE: BLUE BOY ENERGY (60)
- CUBIC FEET: 50,000 (69, 62)
- TIME/DAY: 14 HRS (63)
- FROM: 05/11/10 (64)
- TO: 08/10/10 (65)
- PEOPLE: 21
- EQUIP.: 5 SERVERS (66)
- SUBMIT (67)

OPTIMIZING POWER CONSUMPTION IN PLANNED PROJECTS

TECHNICAL FIELD

The present invention relates to optimizing power consumption in planning projects directed towards all forms of human activity and particularly in computer related projects.

BACKGROUND OF THE INVENTION

In this time of turbulent change in the way business is conducted world wide, there is pressure on businesses of all sizes and across all industries. A major challenge is the control and optimization of power consumption in all endeavors. For example, since computer control and related computer functions are pervasive in all human activities, the reduction of power usage and power consumption optimization should be considered in the information technology industries. It has been estimated that for every $1.00 spent on hardware, an additional $0.50 is spent on power and cooling. It has also been estimated that over the next five (5) years, the expense to cool the already installed base of servers is projected to increase at four (4) times the growth rate of new server spending. The cost of electricity is rapidly rising. Utilities available to the public often may not have the capacity to satisfy IT customer demands.

The recognition of the above challenges has led to developments such as "Smart Planet", "Go Green" and the like. These efforts demonstrate that reduction of power consumption is very beneficial for business profits and establish the business as a good community member.

SUMMARY OF THE INVENTION

The present invention recognizes that in order to optimize power consumption, a project plan should be developed involving every level of the planned project, and power consumption of activities at each level have to be made granular, as granular as possible, so that power consumption variances between planned and actual may be adjusted at every level and sublevel.

The invention provides a computer controlled interactive display system and computer program for optimizing power consumption in a planned project which comprises establishing a database rates of power consumption of a plurality of objects. Then entering a list of power consuming objects planned to be in the planned project on an interactive display. Also entering on said display the planned period of time that each object on the list will be in use. The method automatically accesses, from the database, the rate of power consumption of each object on the list and automatically calculates the power consumption of each object on the list over the planned period time of use of the object.

Then, during actual use, the actual power consumption of each object on the list is automatically tracked over the planned period of time of use and the difference between the planned and actual power consumption of each object on the list is automatically calculated. The difference for each object on the list is displayed so that the user may take action interactively.

In accordance with another aspect of the invention, the total power consumption of all objects on the list is automatically calculated and the total actual power consumption of all objects on the list is automatically tracked. Then the difference between the planned and actual total power consumption of all objects on the list is automatically calculated and this difference in said total power consumption is displayed.

In accordance with another aspect of the invention, the rate of power consumption over a period of time for an object is affected by a predetermined set of variable conditions; and the user is interactively prompted on the display to enter the estimated values for the set of parameters.

In accordance with another aspect of this invention, the rate of power consumption being accessed for an object may not be in the database. In such a case, there can be an automatic search for said rate of power consumption via the Internet and the resulting rate of power consumption is then stored in the database.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a diagrammatic illustration of an interactive display screen for the entry of the list of the power consuming objects to be used in the planned project;

FIG. 4 is the interactive display screen of FIG. 3, as the user is entering times over which the power consuming objects are planned for use in the planned project;

FIG. 5 is the interactive display screen of FIG. 3, as the user is entering ancillary parameters that affect power consumption for an object;

DETAILED DESCRIPTION OF THE PREFERRED EMBODIMENT

Figure 1:
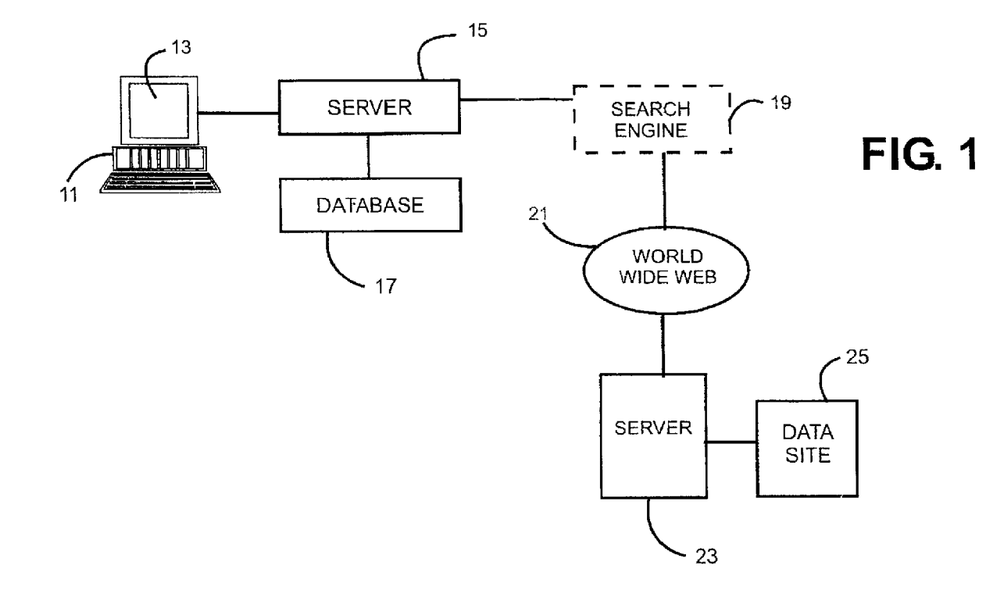
FIG. 1 is a very generalized view of a computer system including the Internet, i.e. World Wide Web, which may be used to implement an embodiment of this invention.

Referring to FIG. 1, there is shown a very generalized view of a computer system including the Internet, i.e. World Wide Web (Web), connections that may be used to implement an embodiment of the present invention. Computer station 11 has an user interactive display interface 13 that may be used for the entry and output of display data (hereinafter described with respect to FIGS. 2 through 4). Server 15 connects computer 11 to database 17 in which the power rates of objects, e.g. machines, or IT devices or any other energy consuming devices, that are to be used in the planned projects. The power consumption rate data in database 17 is cumulative, i.e. the data will grow as more devices are used in planned projects. Of course, as will be hereinafter described, there may be circumstances wherein the needed power consumption data for a planned object is not in the database.

The present system through any standard Web browser in server 15 may access any standard search engine 19 to access via the Web 21, a Web server 23 supporting the vendor's Web data site 25 of a vendor of the device or machine for which the power consumption rate is needed, and to extract the power consumption rate data required. The resulting data will be stored in the user's computer database 17.

Figure 2:
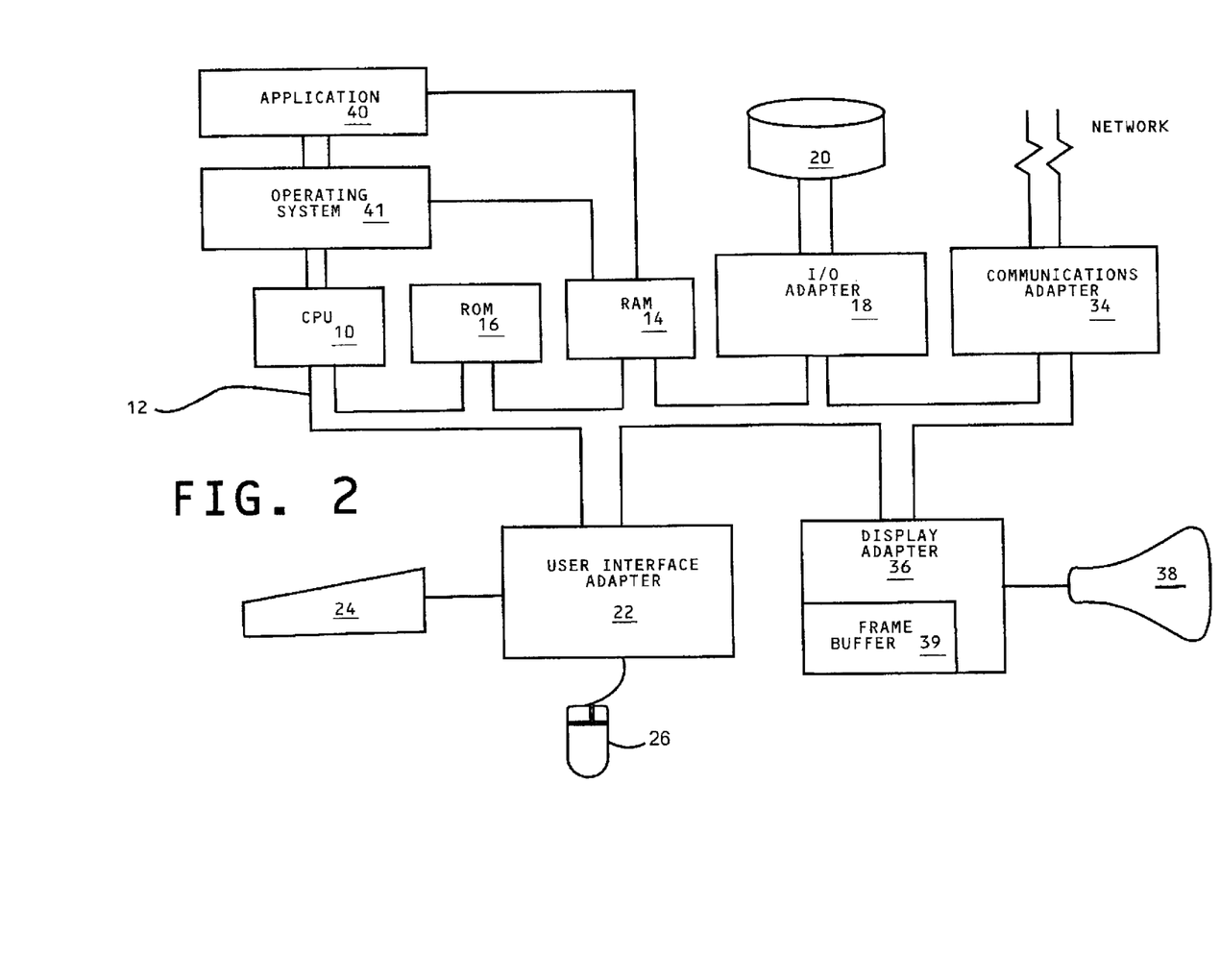
FIG. 2 is a block diagram of a data processing system including a central processing unit, a database and network connections via a communications adapter that is capable of providing the display computer and servers used in the present invention.

With respect to FIG. 2, there is shown an illustrative diagrammatic view of a data processing system including a central processing unit and network connections via a communications adapter that is capable of functioning as a user's computer controlled display station and as the user's servers and the servers at the Web data source sites.

A central processing unit (CPU) 10, such as one of the microprocessors, e.g. from System p series available from International Business Machines Corporation (IBM), is provided and interconnected to various other components by system bus 12. An operating system 41 runs on CPU 10, provides control and is used to coordinate the function of the various components of FIG. 2. Operating system 41 may be one of the commercially available operating systems. Application programs 40, such as the project planning programs of this invention in computer station 11, are moved into and out of the main memory Random Access Memory (RAM) 14. These programming applications may be used to implement functions of the present invention. ROM 16 includes the Basic Input/Output System (BIOS) that controls the basic computer functions of computer 11 or servers 17 and 23. RAM 14, storage adapter 18 and communications adapter 34 are also interconnected to system bus 12. Storage adapter 18 communicates with the disk storage device 20. Communications adapter 34 interconnects bus 12 with the outside Web. I/O devices are also connected to system bus 12 via user interface adapter 22. Optionally, keyboard 24 and mouse 26 may be connected to bus 12 through user interface adapter 22. Where a display is used, display buffer 39 connected through display adapter 36 to bus 12 supports display 38.

With reference to FIG. 3, an illustrative display screen for the entry of the list of the power consuming objects to be used the planned project. On the display screen 45, the interactive user enters a list of all of the objects to be used in the planned project at all levels of the planned project. Listed are the starting 47 and final 48 times of the use of the resources, the resource name 46. The information regarding the objects are interactively requested from the user entering the planned project through prompting panels to be described with respect to FIGS. 4 and 5. From this entered data, the implementation of the invention will automatically calculate the planned power consumption for each object and will display these planned power consumptions in column 49. Then, when the project is carried out, the actual consumption will be automatically calculated based upon readings from standard monitoring and sensing devices appropriate to the parameters being monitored and listed in column 50 so that appropriate adjustments may be made. It should be noted that in planning, the planned consumption of each object may be totaled to provide the whole power consumption for the project. Likewise the actual consumption for each object may be totaled to provide a comparison that may be adjusted.

Referring now to FIG. 4, there will briefly described how the information for each objected may be entered by a user in response to prompting dialog box 58 which pops up when a user clicks on a row 51 listing a specific resource. The user is prompted to name the resource 52, to enter the hours per day 53 during which the power consuming resource will be operational, to enter the period of start 54 and end 55 of the project. When the user submits 56 the data, the system automatically calculates the planned power consumption that will be listed for this object row in column 49. There may be certain resource objects, the power consumption of which is dependent upon ancillary variable parameters affected by operating conditions. FIG. 5 shows the data entry dialog box 68 for a resource in row 61. The object 60 involves the power consumption planned to maintain a working temperature in a facility for which the number of cubic feet is entered 69, as well as hours of operation per day 62, the period of operation from entry 63 to entry 64, the planned number of workers 65 and equipment 66. Upon submission 67, the planned power consumption for the object will be calculated and will be listed for further comparison with the actual power consumption.

Figure 6:
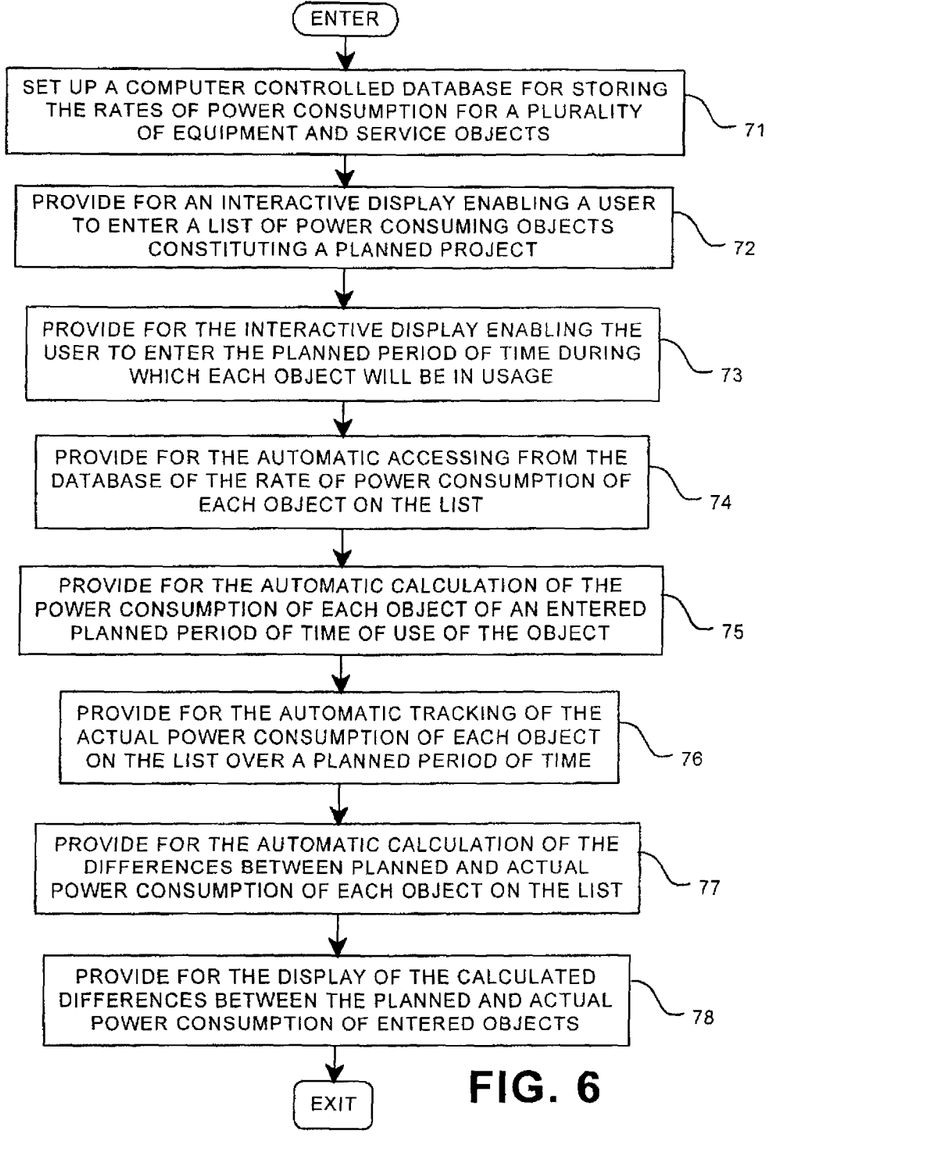
FIG. 6 is an illustrative flowchart describing the setting up of the process of the present invention for optimizing power consumption in a planned project.

FIG. 6 is a general flowchart of an illustrative program set up to implement the present invention for optimizing power consumption in a planned project. A computer controlled database is provided for storing the rates of power consumption for a plurality of equipment and service objects, step 71. Provision is made to enable a user to enter a list of power consuming objects that constitute a planned project, step 72. Provision is made to enable a user to enter the planned period of time during which each object will be in use, step 73. Provision is made for the automatic accessing from the database of the rate of power consumption of each object on the list, step 74. Provision is made for the automatic calculation of the planned power consumption of each object over an entered planned time period of use of the object, step 75. Provision is made for the automatic tracking of the actual power consumption of each object over the time period of use of the object, step 76. Provision is made for the automatic calculation of the differences between planned and actual power consumption for each object on the list, step 77. Provision is made for the display of the calculated differences between planned and actual power consumption of the entered objects, step 78.

Figure 7:
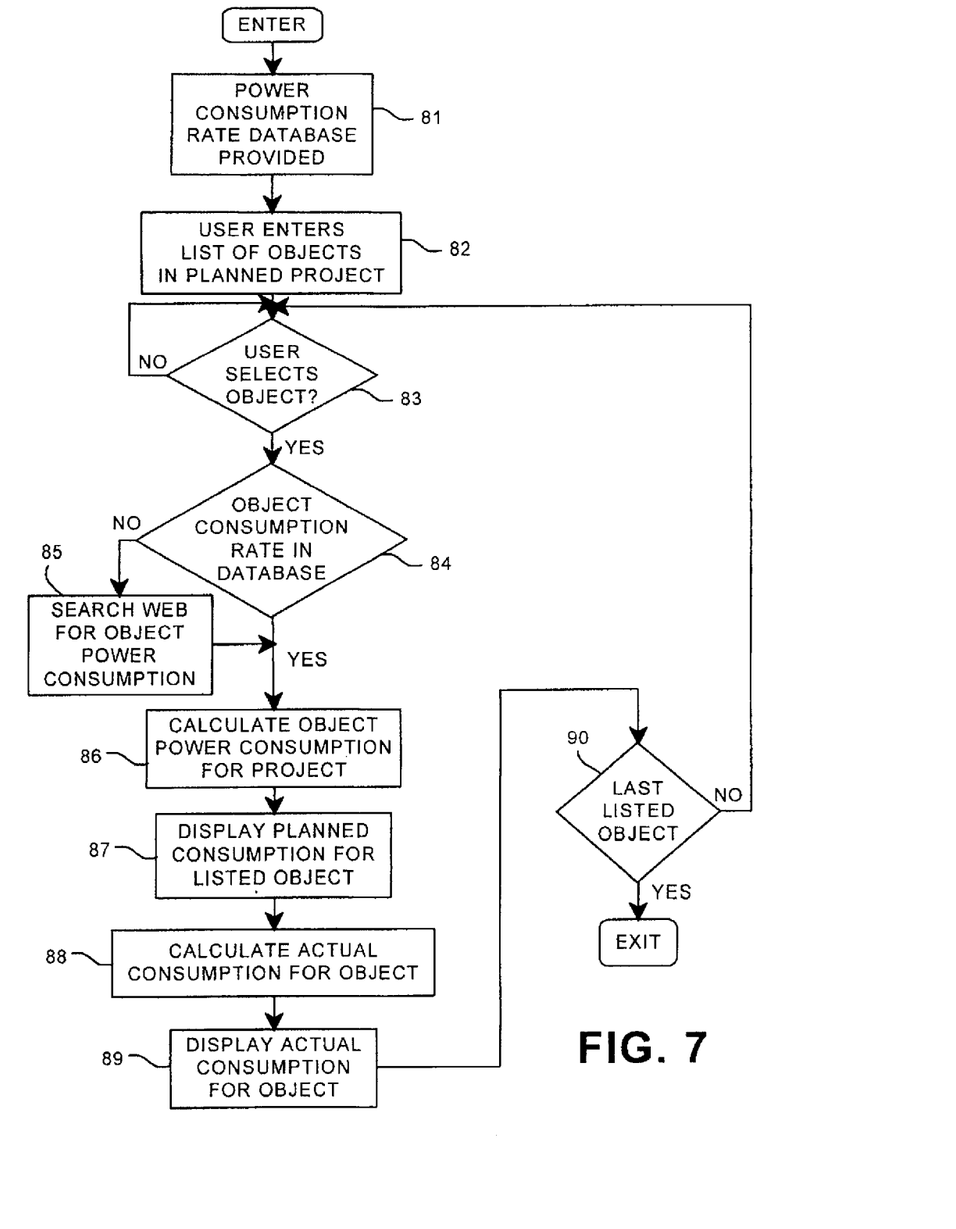
FIG. 7 is a flowchart of an illustrative run of the process setup in FIG. 6.

The illustrative running of a process set up according to FIG. 6 will now be described with respect to the flowchart of FIG. 7. A power consumption database for objects is provided, step 81. The user enters a list of planned objects for the planned project, step 82. A determination is made as to whether a user has selected an object, step 83. If Yes, a further determination is made as to whether the consumption rate of the selected object is in the database, step 84. If No, a Web search is conducted to obtain the object consumption rate from a vendor and to enter this data into the database, step 85. Then, or if step 84 is Yes, the planned power consumption for the object is calculated, step 86. The planned consumption for the object is displayed on the list of FIG. 3, step 87. The actual power consumption is calculated, step 88, and displayed, step 89. At this point a determination may conveniently be made as to whether the object is the last planned object, step 90. If Yes, the process is exited. If No, then the process is returned to step 83 and continued.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims. For example, the interactive feedback on unsatisfactory actual power consumption may suggest ancillary functions for reducing power consumption. The displayed feedback may suggest the possibility of the use of more daylight or parallel projects. Also, for a particular device or object, the method may be set up to perform an Internet search to find and suggest a replacement machine, device or service.

What is claimed is:

1. A computer controlled interactive display system for optimizing power consumption in a planned project comprising:
    a processor; and
    a computer memory holding computer program instructions which when executed by the processor perform the method comprising:
        storing in a database rates of power consumption of a plurality of objects;
        entering a list of power consuming objects planned to be in said planned project on an interactive display;
        entering on said display, the planned period of time of use of each object on said list;
        automatically accessing from said database, the rate of power consumption of each object on said list;
        automatically calculating the power consumption of each object on said list over the planned period time of use of said object;
        automatically tracking the actual power consumption of each object on said list over said planned period of time of use;

automatically calculating the difference between the planned and actual power consumption of each object on said list; and displaying said difference for each object on said list.

2. The system of claim 1, wherein the performed method further includes:

automatically calculating the total power consumption of all objects on said list;

automatically tracking the total actual power consumption of all objects on said list;

automatically calculating the difference between the planned and actual total power consumption of all objects on said list; and displaying said difference for in said total power consumption.

3. The system of claim 1, wherein:

a rate of power consumption over a period of time for an object is affected by a predetermined set of variable conditions; and the performed method further includes interactively prompting a user on said display to enter to estimated values for said set of parameters.

4. The system of claim 1, wherein:

the rate of power consumption being accessed for an object is not in said database, and the performed method further includes:

automatically searching for said rate of power consumption via the Internet; and storing the resulting rate of power consumption in the database.

5. The system of claim 1, wherein the performed method further includes automatically calculating the costs of said differences in power consumption for objects on said list.

6. The system of claim 1, wherein said planned project is an information technology development.

7. The system of claim 1, wherein said planned project is the operation of a business involving physical objects and service objects.

8. A computer usable non-transitory storage medium having stored thereon a computer readable program for optimizing power consumption in a planned project on a computer controlled display, wherein the computer readable program when executed on a computer causes the computer to:

store in a database rates of power consumption of a plurality of objects;

enter a list of power consuming objects planned to be in said planned project on an interactive display;

enter on said display, the planned period of time of use of each object on said list;

automatically access from said database, the rate of power consumption of each object on said list;

automatically calculate the power consumption of each object on said list over the planned period time of use of said object;

automatically track the actual power consumption of each object on said list over said planned period of time of use;

automatically calculate the difference between the planned and actual power consumption of each object on said list; and display said difference for each object on said list.

9. The computer usable storage medium of claim 8, wherein the computer readable program when executed on a computer further causes the computer to:

automatically calculate the total power consumption of all objects on said list;

automatically track the total actual power consumption of all objects on said list;

automatically calculate the difference between the planned and actual total power consumption of all objects on said list; and display said difference for in said total power consumption.

10. The computer usable storage medium of claim 8, wherein:

a rate of power consumption over a period of time for an object is affected by a predetermined set of variable conditions; and said computer readable program when executed interactively prompts a user on said display to enter to estimated values for said set of parameters.

11. The computer usable storage medium of claim 8, wherein the rate of power consumption being accessed for an object is not in said database, and the computer readable program when executed further causes the computer to automatically search for said rate of power consumption via the Internet; and to store the resulting rate of power consumption in the database.

12. The computer usable storage medium of claim 8, wherein the computer readable program when executed further causes the computer to automatically calculate the costs of said differences in power consumption for objects on said list.

13. The computer readable storage medium of claim 8, wherein said planned project is an information technology development.

14. The computer readable storage medium of claim 8, wherein said planned project is the operation of a business involving physical objects and service objects.

* * * * *